(12) United States Patent  
Takagi et al.

(10) Patent No.: US 9,417,378 B2  
(45) Date of Patent: Aug. 16, 2016

(54) LIGHT GUIDE AND LIGHT EMITTING DEVICE

(71) Applicant: OMRON Corporation, Kyoto-shi, Kyoto (JP)

(72) Inventors: Yoshihiko Takagi, Kyoto (JP); Masayuki Shinohara, Kyoto (JP); Yoshimasa Osumi, Kyoto (JP); Norikazu Kitamura, Osaka (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 80 days.

(21) Appl. No.: 14/470,705

(22) Filed: Aug. 27, 2014

(65) Prior Publication Data

US 2015/0092444 A1   Apr. 2, 2015

(30) Foreign Application Priority Data

Sep. 27, 2013   (JP) .................. 2013-202754

(51) Int. Cl.
  *F21V 7/04*  (2006.01)
  *F21V 8/00*  (2006.01)

(52) U.S. Cl.
  CPC .............. *G02B 6/006* (2013.01); *G02B 6/0036* (2013.01); *G02B 6/0035* (2013.01); *G02B 6/0038* (2013.01); *G02B 6/0068* (2013.01)

(58) Field of Classification Search
  CPC .. G02B 6/0015; G02B 6/0016; G02B 6/0018; G02B 6/0035; G02B 6/0036; G02B 6/0038; G02B 6/006; G02B 6/0068
  USPC .......................................... 362/623, 625, 626
  See application file for complete search history.

(56) References Cited

U.S. PATENT DOCUMENTS

| 2009/0073721 A1* | 3/2009 | Kamikatano et al. .. G02B 6/006 362/616 |
| 2009/0190069 A1* | 7/2009 | Dejima et al. ....... G02B 6/0061 362/619 |
| 2012/0188792 A1* | 7/2012 | Matsumoto et al. . G02B 6/0036 362/613 |
| 2013/0265802 A1* | 10/2013 | Kamikatano et al. G02B 6/0036 362/607 |

FOREIGN PATENT DOCUMENTS

JP    H11-85075 A    3/1999

* cited by examiner

*Primary Examiner* — Y M Lee  
(74) *Attorney, Agent, or Firm* — Osha Liang LLP

(57) ABSTRACT

A light guide including a plurality of reflection patterns in a reflection area in a facing surface facing a light exit surface, which area corresponds to a light emitting area, and the reflection patterns are arranged so that an amount of light reflected by the reflection patterns, emitted from the light emitting area to arrive at an observer observing the light exit surface is continuously changed in accordance with a position in the light emitting area.

11 Claims, 8 Drawing Sheets

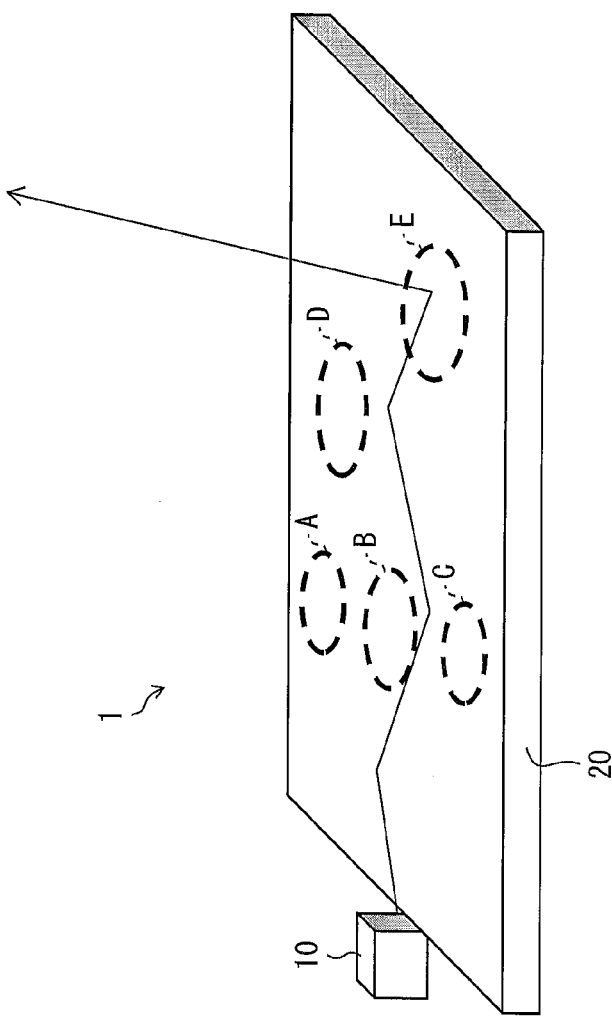
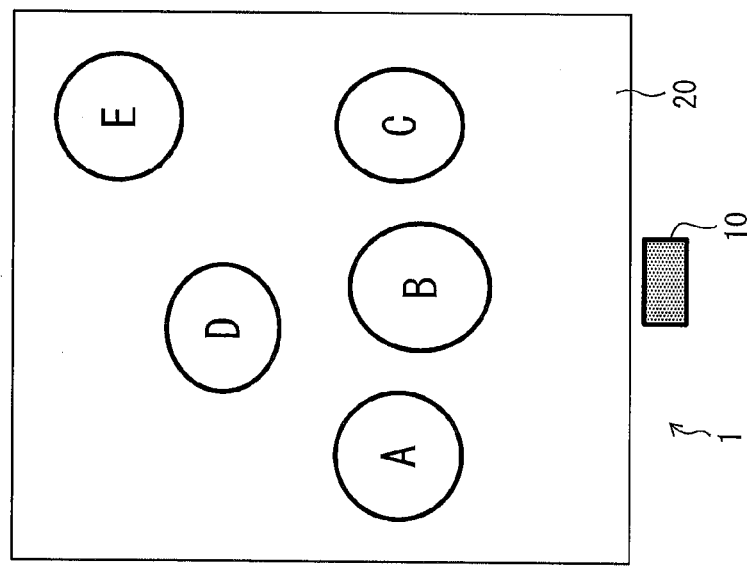

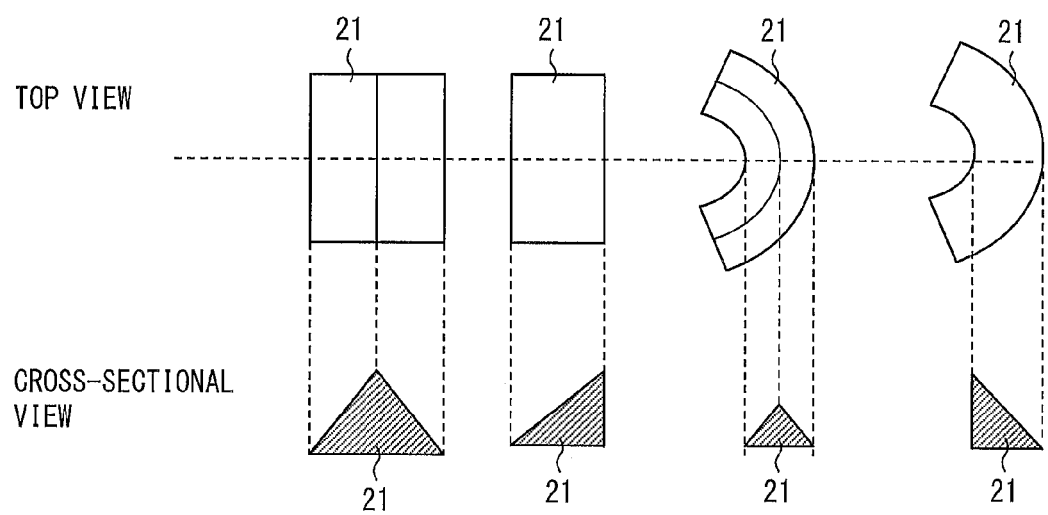

LOW ← → HIGH
(REFLECTION PATTERN ARRANGEMENT DENSITY)

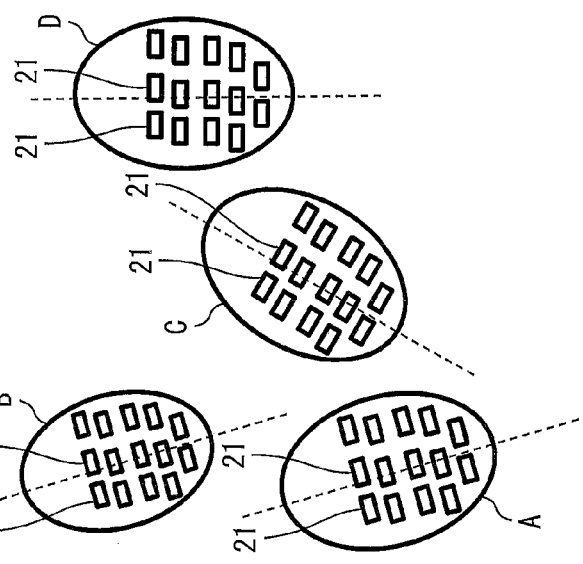
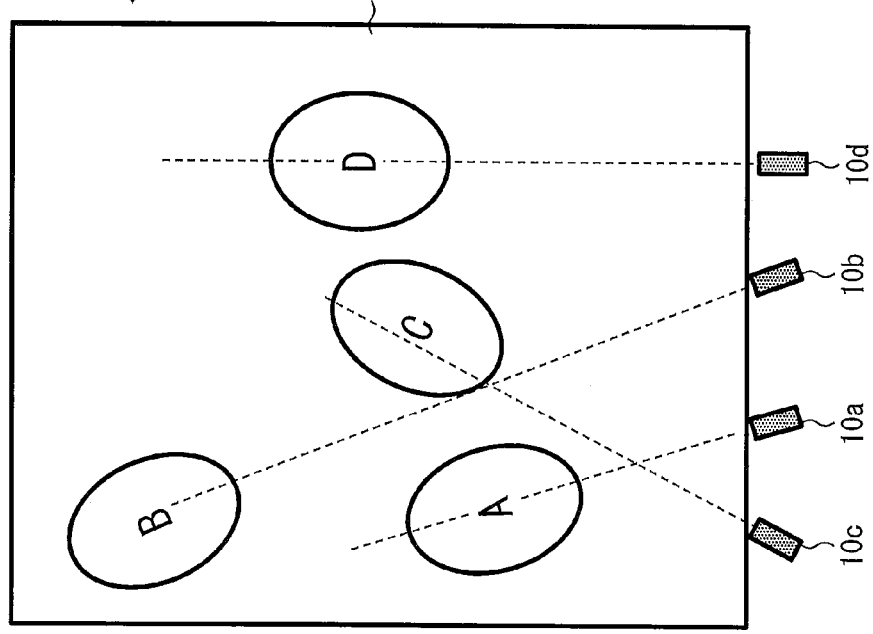
FIG. 9(b)
FIG. 9(a)

LIGHT GUIDE AND LIGHT EMITTING DEVICE

CROSS-REFERENCE TO RELATED APPLICATIONS

This Nonprovisional application claims priority under 35 U.S.C. §119 to Japanese Patent Application No. 2013-202754 filed in Japan on Sep. 27, 2013, the entire contents of which are hereby incorporated by reference.

BACKGROUND

1. Technical Field

The present invention relates to a light guide in which light which has been emitted from a light source and having entered the light guide body is guided and emitted through a light exit surface, and a light-emitting device including the same.

2. Related Art

Conventionally, there is known a technique in which light emitted from a light source is entered the light guide plate through a side surface of a light guide plate and is reflected by a reflection pattern on a back surface side of the light guide plate so as to be emitted from a front surface of the light guide plate.

For example, Patent Literature 1 discloses a technique in which a reflection pattern is provided in a region, having a shape corresponding to a predetermined letter, of a back surface of a light guide plate, so that a region that is on a front surface side of the light guide plate and corresponds to the letter emits light.

CITATION LIST

Patent Literature

Patent Literature 1
Japanese Patent Application Publication Tokukaihei No. 11-85075 A (Publication date: Mar. 30, 1999)

SUMMARY

However, in the technique of the Patent Literature 1, a letter can be displayed in accordance with an arrangement shape of a reflection pattern, however, only a flat letter can be displayed because a light-emitting state of the letter is substantially uniform.

One or more embodiments of the present invention causes an observer to three-dimensionally recognize the light emitting area in a light guide for guiding light entering from a light source and emitting the light from a light emitting area which is a part of a light exit surface.

A light guide in accordance with one or more embodiments of the present invention, for guiding light emitted from at least one light source and causing the light to be emitted from at least one light emitting area which is defined in a part of a light exit surface, the light guide including: a plurality of reflection patterns arranged in at least one reflection area on a facing surface facing the light exit surface, which at least one reflection area corresponds to the at least one light emitting area, the plurality of reflection patterns being arranged so that an amount of the light arriving at an observer observing the light exit surface from the at least one light emitting area after being reflected on a reflection pattern among the plurality of reflection patterns is continuously changed in accordance with a position in the at least one light emitting area.

With the above structure, an amount of light emitted from the light emitting area to arrive at the observer can be continuously changed in accordance with the position in the light emitting area. Therefore, because the observer can recognize the light emitting area as a light emitting area having a light part and a dark part, it is possible to cause the observer to three-dimensionally recognize a light emitting area.

BRIEF DESCRIPTION OF DRAWINGS

FIGS. 1(a)-1(b) are explanatory views illustrating a schematic structure of a light emitting device including a light guide in accordance with one or more embodiments of the present invention, wherein FIG. 1(a) is a top view and FIG. 1(b) is a perspective view.

FIGS. 3(a)-3(d) illustrate explanatory views illustrating example shapes of the reflection pattern illustrated in FIG. 2(a).

FIGS. 9(a)-9(b) are explanatory views illustrating examples of arrangements of light emitting areas and reflection patterns of a light guide in accordance with one or more embodiments of the present invention.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIGS. 1(a)-1(b) are explanatory views illustrating a schematic structure of a light emitting device 1 including a light guide 20 in accordance with one or more embodiments of the present invention, and FIG. 1(a) is a top view of the light emitting device 1 and FIG. 1(b) is a perspective view of the light emitting device 1.

As illustrated in FIGS. 1(a)-1(b), the light emitting device 1 includes a light source 10 and a light guide plate (light guide) 20.

The light source 10 is arranged to face a side surface (light incident surface) of the light guide plate 20, and light emitted from the light source 10 is incident on the light guide plate 20 through the side surface of the light guide plate 20. A structure of the light source 10 is not particularly limited, and, for example, an LED (Light Emitting Diode) or the like can be used.

The light guide plate 20 is made from, for example, a light-transmissive material such as acrylic resin, and light incident on the light guide plate 20 from the light source 10 is propagated in the light guide plate 20 while being totally reflected on a top surface (light exit surface) and a back surface (facing surface) of the light guide plate 20, and is emitted from predetermined light emitting areas A to E on the surface of the light guide plate 20.

Figure 2A:
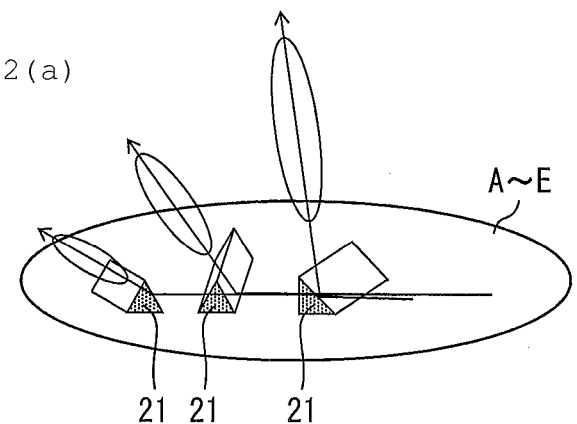
FIG. 2(a) is an explanatory view illustrating arrangements of a reflection pattern included in the light guide illustrated in FIGS. 1(a)-1(b)

Specifically, as illustrated in FIG. 2(a), a plurality of reflection patterns 21 for regularly reflecting, toward the top surface, light entering from the light source 10 and propagating the light in the light guide plate 20 are provided in each of areas (hereinafter, referred to as "reflection areas") on the back surface of the light guide plate 20, which areas correspond to the light emitting areas A to E, respectively.

Figure 2B:
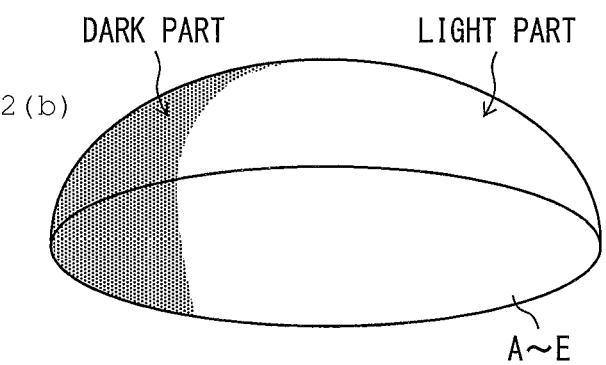
FIG. 2(b) is an explanatory view illustrating a light-emitting state which is recognized by an observer by including the reflection pattern shown in FIG. 2(a)
Figure 2C:
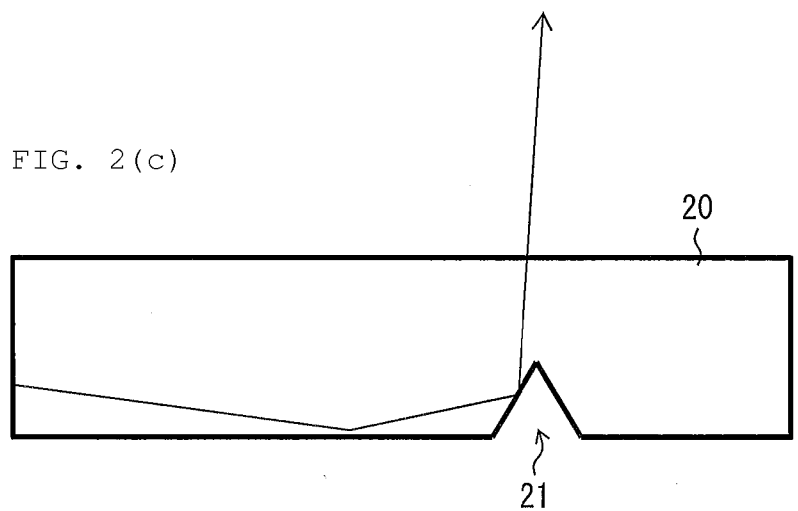
FIG. 2(c) illustrates a shape of the reflection pattern.

Note that, in one or more embodiments of the present invention, as illustrated in FIG. 2(c) and FIG. 3(a), there is provided, as the reflection pattern 21, a groove whose cross section orthogonal to the back surface of the light guide plate 20 has a cross-sectional shape of a substantially isosceles triangle (V shape) and which is provided by cutting out the back surface of the light guide plate 20 so as to straightly extend the groove in a direction orthogonal to the cross section.

In one or more embodiments of the present invention, the reflection patterns 21 arranged in the reflection areas corresponding to the respective light emitting areas A to E are arranged so that an angle between (i) a reflection surface of each reflection pattern 21, which reflection surface is seen from a direction orthogonal to the back surface of the light guide plate 20, and (ii) a straight line connecting the light source 10 and a center of the reflection pattern 21 (a center in an extending direction of the reflection surface, which center is seen from a direction orthogonal to the back surface of the light guide plate 20) is continuously changed for each adjacent reflection patterns in the reflection areas corresponding to the light emitting areas.

Figure 4A:
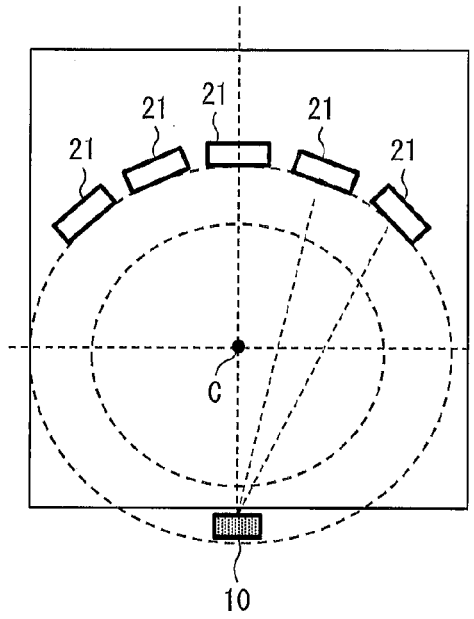
FIGS. 4(a)-4(d) illustrate explanatory views illustrating example arrangements of the reflection pattern illustrated in FIG. 2(a).

Specifically, as illustrated in FIG. 4(a), in each of the reflection area corresponding to the light emitting area, a point between the reflection area and the light source 10, which point is located on a straight line connecting a part of the reflection area (e.g., center of the area) and the light source 10 is defined as a pattern arrangement center C, and the reflection patterns 21 corresponding to the light emitting areas are arranged on a concentric circle (concentric circle arrangement) around the pattern arrangement center C. Further, the reflection patterns 21 are arranged so that normal directions of the reflection surfaces of the reflection patterns 21 are directed to the pattern arrangement center C when the normal directions are seen from a direction orthogonal to the back surface of the light guide plate 20.

Therefore, as shown in arrows and ellipses of FIG. 2(a), by continuously changing an emitting direction of light emitted from each of the light emitting areas A to E in accordance with the position in the light emitting area, it is possible to emit light which has a strong directivity and is directed to the emitting direction. Therefore, an amount of light emitted from each of the light emitting area A to E to arrive at an observer observing the light guide plate 20 can be continuously changed in accordance with the position in the light emitting area. As a result, as shown in FIG. 2(b), it is possible to cause the observer observing the light guide plate 20 to recognize the light emitting area as a light emitting area whose brightness is continuously changed and which has a light part and a dark part, and therefore the observer can three-dimensionally recognize the light emitting area.

Figure 5:
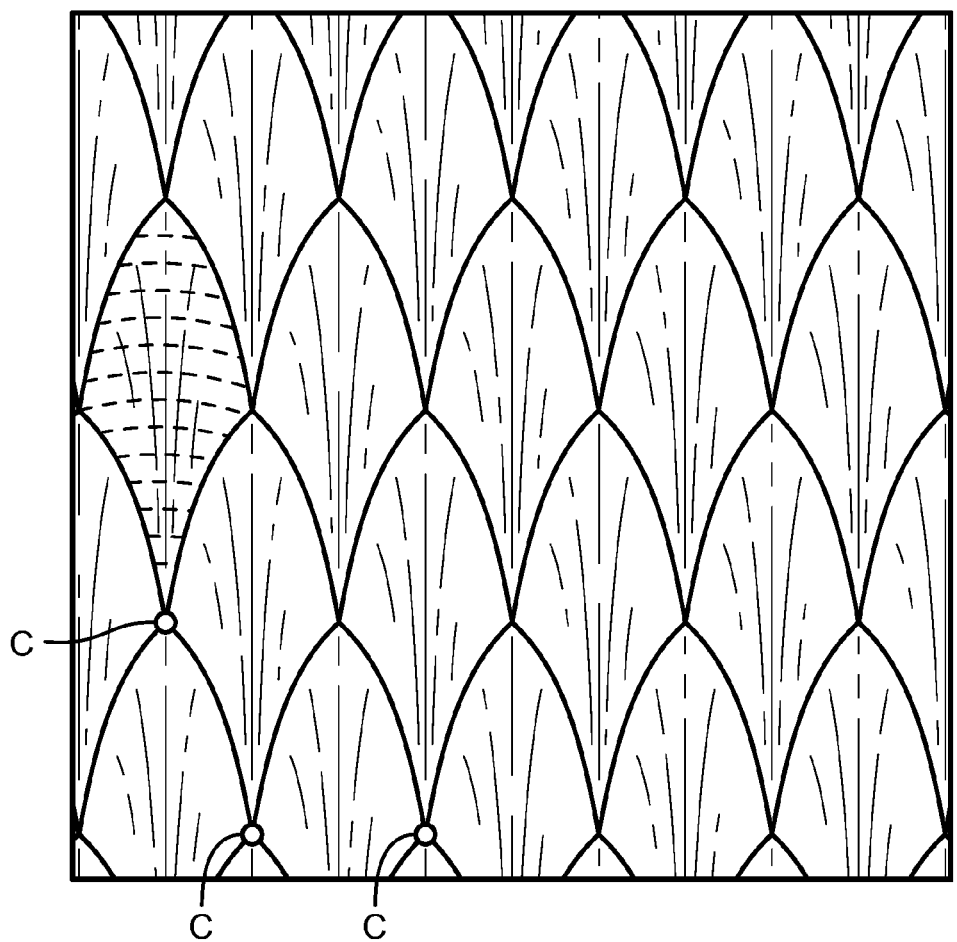
FIG. 5 is an explanatory view illustrating an example of a light-emitting state of the light emitting device illustrated in FIGS. 1(a)-1(b).

FIG. 5 is an explanatory view illustrating an example of a light-emitting state of the light guide plate 20 in accordance with one or more embodiments of the present invention. The example of FIG. 5 illustrates a light-emitting state in which a plurality of scale-like light emitting areas are provided and the reflection pattern 21 is arranged on a concentric circle (see broken line part in FIG. 5) around a pattern arrangement center C, where a position corresponding to an end section of the each of the light emitting areas is defined as the pattern arrangement center C. As described above, in each of the light emitting areas, the brightness is continuously changed in accordance with the position in the light emitting area. This makes it possible to three-dimensionally recognize the light emitting areas.

Note that, in one or more embodiments of the present invention, as shown in FIG. 2(a), the reflection pattern 21 whose cross-sectional shape is substantially an isosceles triangle shape and has a groove straightly extending in a direction orthogonal to the cross section, however, a shape of the reflection pattern 21 is not limited. For example, as shown in FIG. 3(b), a groove may have substantially a right triangle shape as the cross-sectional shape of a cross-section orthogonal to the back surface of the light guide plate 20. As shown in FIGS. 3(c)-3(d), the groove may also may be curvedly extended in a direction in parallel to the back surface of the light guide plate 20.

An angle (a tilt angle of the reflection surface of the each reflection pattern 21 with respect to the back surface of the light guide plate 20) between the reflection surface of the each reflection pattern 21 and the back surface of the light guide plate 20 may be continuously changed in accordance with where the reflection patterns from which the light is reflected are located in the light emitting area. For example, the angle may be continuously changed in accordance with a distance from the light source 10. Therefore, the amount of light emitted from the light emitting area toward an observer can be largely changed in accordance with the position in light emitting area. This makes it possible to recognize the light emitting area more three-dimensionally.

Lengths of the reflection patterns 21 (lengths in a direction in parallel to the reflection surfaces) are not particularly limited. The lengths of the reflection patterns 21 may be different from one another, and may be the same.

The reflection pattern 21 is not limited to a groove-like pattern obtained by cutting out the light guide plate 20, and the reflection pattern 21 may be protruded outward from the back surface of the light guide plate 20. Further, the reflection pattern 21 is not limited to a structure in which the reflection pattern 21 and the light guide plate 20 are integrally provided, and, for example, may be attached to the back surface of the light guide plate 20.

A method of arranging the reflection patterns 21 in the reflection areas corresponding to the light emitting areas is not limited to a method shown in FIG. 4(a), and is not limited provided that the angle between (i) the reflection surface of the each reflection pattern 21 and (ii) the straight line connecting the light source 10 and the center of the reflection pattern 21 is changed in accordance with an arrangement position of the reflection pattern 21 in the reflection area.

Figure 4B:
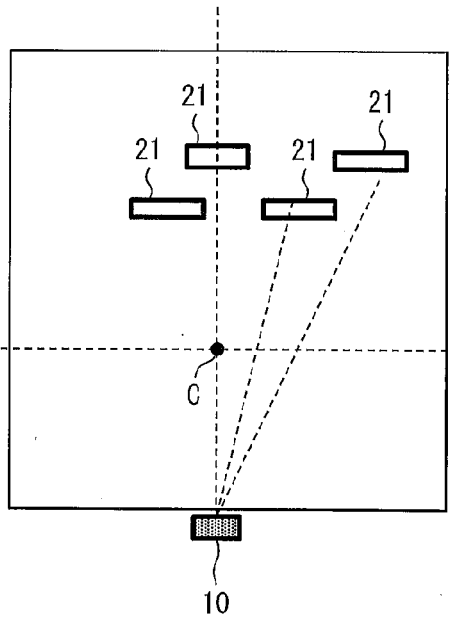

For example, as shown in FIG. 4(b), the reflection patterns 21 may be arranged (arrayed) so that directions of the reflection surfaces of the reflection patterns 21 are in parallel to one another and extending directions of the reflection patterns 21 are orthogonal to an optical axis direction of light incident on the light guide plate 20 from the light source 10.

Figure 4C:
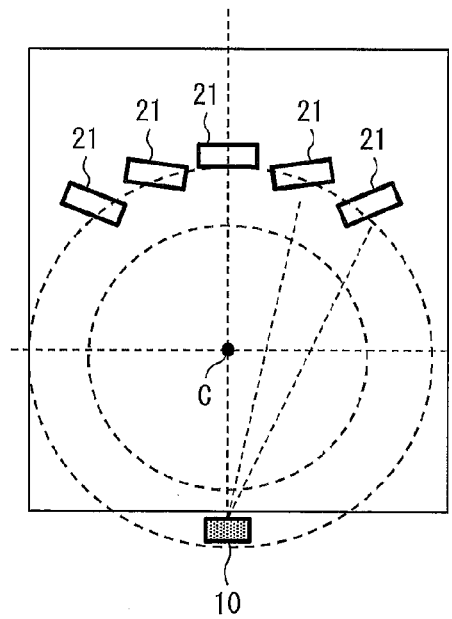

As shown in FIG. 4(c), the reflection patterns 21 may be arranged so that (i) the reflection patterns 21 are arranged on the concentric circle around the pattern arrangement center C and (ii) normal directions of the reflection surfaces of the reflection pattern 21 are continuously changed in a direction which is different from a direction toward the pattern arrangement center C.

Figure 4D:
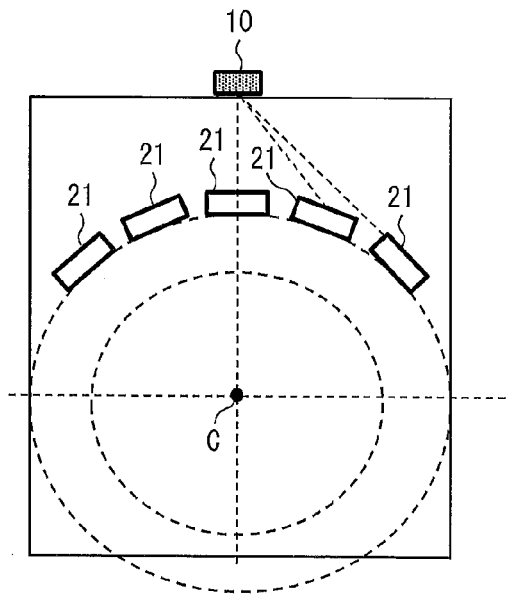

As shown in FIG. 4(d), each of the reflection patterns 21 may be arranged so that (i) the pattern arrangement center C is defined in a position which is on a straight line passing through a part of the reflection area and the light source 10 and is farther away from the reflection area seen from the light source 10, (ii) the reflection pattern 21 is arranged on the concentric circle around the pattern arrangement center C, and (iii) a normal direction of the reflection surface of the reflection pattern 21 which passes substantially a center section of the reflection pattern 21, which center section is seen from a direction orthogonal to the back surface of the light guide plate 20, is substantially in parallel to a straight line which passes substantially the center section and the pattern arrangement center C. Also in this case, an amount of light reflected by the reflection patterns 21 and emitted from the light emitting area to arrive at an observer is changed in accordance with the position in the light emitting area, and a part of the light emitting area is recognized as a light part. As a result, the light emitting area is three-dimensionally recognized.

Note that, in examples of FIGS. 4(c)-4(d), in a case where the observer observes the light guide plate 20 while moving, a position of a part recognized as a light part in the light emitting area (a part seemed to have a sheen) is changed in accordance with a position of the observer relative to the light guide plate 20. This makes it possible to recognize the light emitting area more three-dimensionally.

In the reflection areas corresponding to the light emitting areas A to E, a position of the arrangement pattern center C relative to the each reflection area and an arrangement angle of the each reflection pattern 21 (an angle between (i) a straight line connecting a center of the reflection pattern seen from a direction orthogonal to the back surface of the light guide plate 20 and the light source or the arrangement pattern center C corresponding to the reflection area and (ii) the reflection surface of the reflection pattern, a tilt angle of the reflection surface relative to the back surface of the light guide plate, or both thereof) may be different among the light emitting areas.

Figure 6:
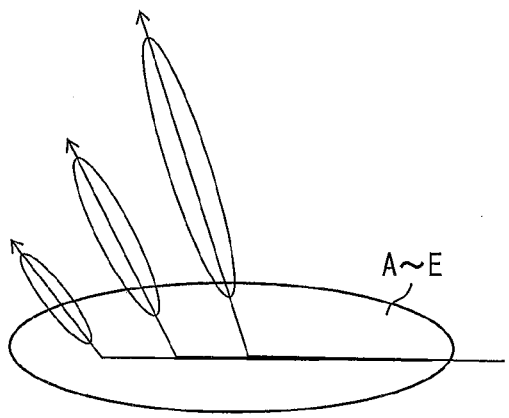
FIG. 6 is an explanatory view illustrating an example arrangement of the reflection pattern illustrated in FIG. 2(a).

Above, an arrangement is described in which directions of the reflection surfaces of the reflection patterns 21 in the reflection areas corresponding to light-emitting patterns are continuously changed in accordance with where the reflection pattern is located in the reflection area, however, an arrangement is not limited thereto. For example, as shown in FIG. 6, light having a strong directivity toward its emitting direction may be emitted by continuously changing an arrangement density of the reflection pattern 21 in the area corresponding to each of the light emitting areas A to E (the number of reflection patterns 21 arranged per unit area) in accordance with where the reflection pattern is located in the reflection area, thereby continuously changing an amount of light emitted from each of the light emitting areas A to E in the respective light emitting areas. Also in this case, it is possible to cause an observer observing the light guide plate 20 to recognize each of the light emitting areas as a light emitting area whose brightness is continuously changed in accordance with the position in the light emitting area and which has a light part and a dark part, and therefore it is possible to three-dimensionally recognize the light emitting area.

The directions of the reflection surfaces of the reflection patterns 21 in the reflection areas corresponding to the light-emitting patterns may be continuously changed in accordance with where the reflection pattern is located in the reflection area, and the arrangement densities of the reflection patterns 21 may be continuously changed in accordance with where the reflection pattern is located in the reflection area.

In one or more embodiments of the present invention, the plate-like light guide plate (light guide) 20 has been described, however, the shape of the light guide 20 is not limited thereto, and, for example, may be a cylindrical shape, a spherical shape, a free-form shape.

Shapes of the light emitting areas A to E are not particularly limited, and may be shaped in conformity with, for example, a letter, a symbol, a design, or the like. Further, arrangement positions of, the number of, and the sizes of the light emitting areas A to E are not particularly limited, and therefore it is possible to arbitrarily determine them.

One or more embodiments of the present invention is described below. For the sake of easy explanation, members having the like functions as the figures described above are denoted by the like reference signs and the detailed description thereof is omitted.

Figure 7:
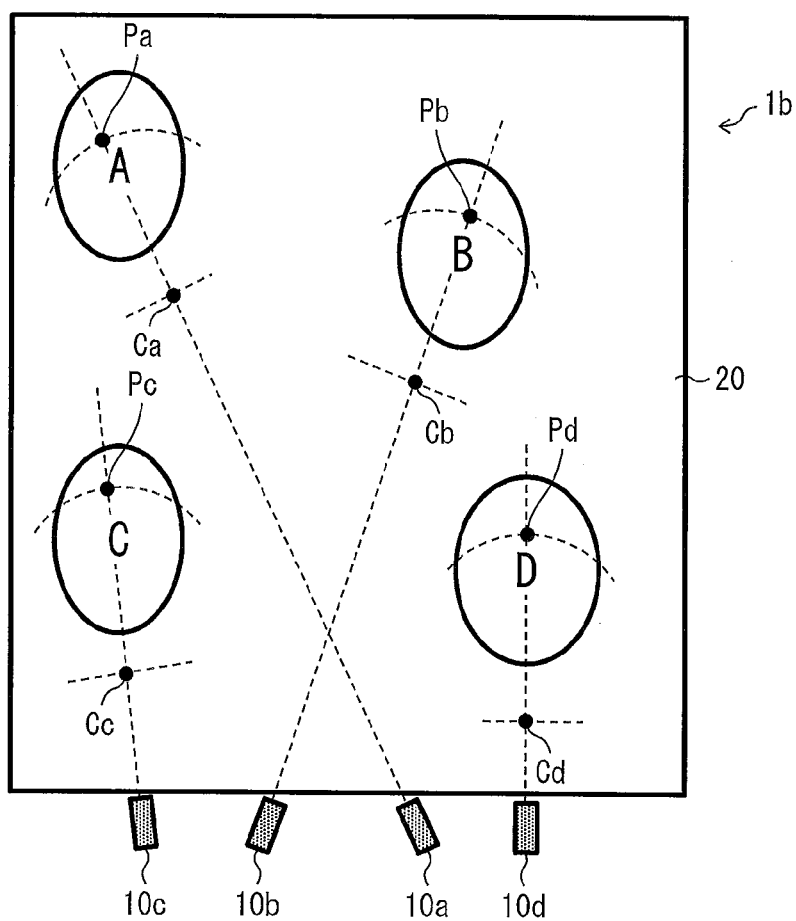
FIG. 7 is an explanatory view illustrating a schematic structure of a light emitting device including a light guide in accordance with one or more embodiments of the present invention.

FIG. 7 is an explanatory view illustrating a structure of a light emitting device 1b in accordance with one or more embodiments of the present invention. Above is described a structure having a single light source 10, however, in one or more embodiments of the present invention, the light emitting device 1b includes a plurality of light sources 10a to 10d.

A light source which emits light having a directivity, such as an LED, can be used as the light sources 10a to 10d. Note that, in one or more embodiments of the present invention, the light sources 10a to 10d are arranged such that (i) the light source 10a is directed so that an optical axis direction of light emitted from the light source 10a is directed to a light emitting area A, (ii) the light source 10b is directed so that an optical axis direction of light emitted from the light source 10b is directed to a light emitting area B, (iii) the light source 10c is directed so that an optical axis direction of light emitted from the light source 10c is directed to a light emitting area C, and (iv) the light source 10d is directed so that an optical axis direction of light emitted from the light source 10d is directed to a light emitting area D.

In the reflection area in the back surface (facing surface) of the light guide plate (light guide) 20, which reflection area corresponds to the light emitting area A, a plurality of reflection patterns 21 (not shown in FIG. 7) are arranged on a concentric circle around a pattern arrangement center Ca which is defined on a straight line between the reflection area and the light source 10a, which straight line connects a point Pa in the reflection area and the light source 10a. Note that the reflection patterns 21 are arranged so that straight lines connecting centers of the reflection patterns 21 and the arrangement pattern center Ca are substantially in parallel to normal directions to the reflection surfaces of the reflection patterns 21.

Similarly, in the reflection area in the back surface (facing surface) of the light guide plate (light guide) 20, which reflection area corresponds to the light emitting area B, a plurality of reflection patterns 21 (not shown in FIG. 7) are arranged on a concentric circle around a pattern arrangement center Cb which is defined on a straight line between the reflection area and the light source 10b, which straight line connects a point Pb in the reflection area and the light source 10b. Note that the reflection patterns 21 are arranged so that straight lines connecting centers of the reflection patterns 21 and the arrangement pattern center Cb are substantially in parallel to normal directions to the reflection surfaces of the reflection patterns 21.

Similarly, in the reflection area in the back surface (facing surface) of the light guide plate (light guide) 20, which reflection area corresponds to the light emitting area C, a plurality of reflection patterns 21 (not shown in FIG. 7) are arranged on a concentric circle around a pattern arrangement center Cc which is defined on a straight line between the reflection area and the light source 10c, which straight line connects a point Pc in the reflection area and the light source 10c. Note that the reflection patterns 21 are arranged so that straight lines connecting centers of the reflection patterns 21 and the arrangement pattern center Cc are substantially in parallel to normal directions to the reflection surfaces of the reflection patterns 21.

Similarly, in the reflection area in the back surface (facing surface) of the light guide plate (light guide) 20, which reflection area corresponds to the light emitting area B, a plurality of reflection patterns 21 (not shown in FIG. 7) are arranged on a concentric circle around a pattern arrangement center Cd which is defined on a straight line between the reflection area and the light source 10d, which straight line connects a point Pd in the reflection area and the light source 10d. Note that the reflection patterns 21 are arranged so that straight lines connecting centers of the reflection patterns 21 and the arrangement pattern center Cd are substantially in parallel to normal directions of the reflection surfaces of the reflection patterns 21.

Therefore, in each of the light emitting area A to D, it is possible to change brightness recognized by an observer in accordance with the position in the light emitting area. This makes it possible to cause the observer observing the light guide plate 20 to three-dimensionally recognize the light emitting areas A to D.

For example, by changing colors of light emitted from the light sources 10a to 10d or by changing lightening timings of the light sources 10a to 10d, luminescent colors and light-emitting states of the light emitting areas A to D can be individually controlled in the light emitting areas corresponding to the light sources.

Note that a method of arranging the reflection patterns 21 in an area corresponding to each light emitting area is not limited to a method shown in FIG. 7, and the method is not limited provided that brightness recognized by an observer is continuously changed in accordance with a position in a light emitting area.

For example, as shown in FIGS. 9(a)-9(b), the light-emitting device 1b may be arranged so that (i) the plurality of the light emitting areas A to D are provided, (ii) the plurality of light sources 10a to 10d are provided corresponding to the light emitting areas A to D, and (iii) the reflection patterns 21 are arrayed in parallel to one another such that the normal directions of the respective reflection patterns 21 in the reflection areas of the back surface of the light guide plate 20, which reflection areas correspond to the light emitting areas (normal directions of the reflection surfaces, seen from a direction orthogonal to the back surface of the light guide plate 20), are substantially in parallel to an optical axis directions of light emitted from light sources corresponding to the light emitting areas. In this case, the normal directions of the reflection surfaces of the reflection patterns 21 corresponding to the light emitting areas A to D may be changed in each light emitting area.

As shown in the arrangement of FIGS. 9(a)-9(b), an angle between each of the reflection surfaces of the reflection patterns 21 in each of the light emitting area and the back surface of the light guide plate 20 may be continuously changed in accordance with a distance between the light source to the corresponding light emitting area.

Figure 8:
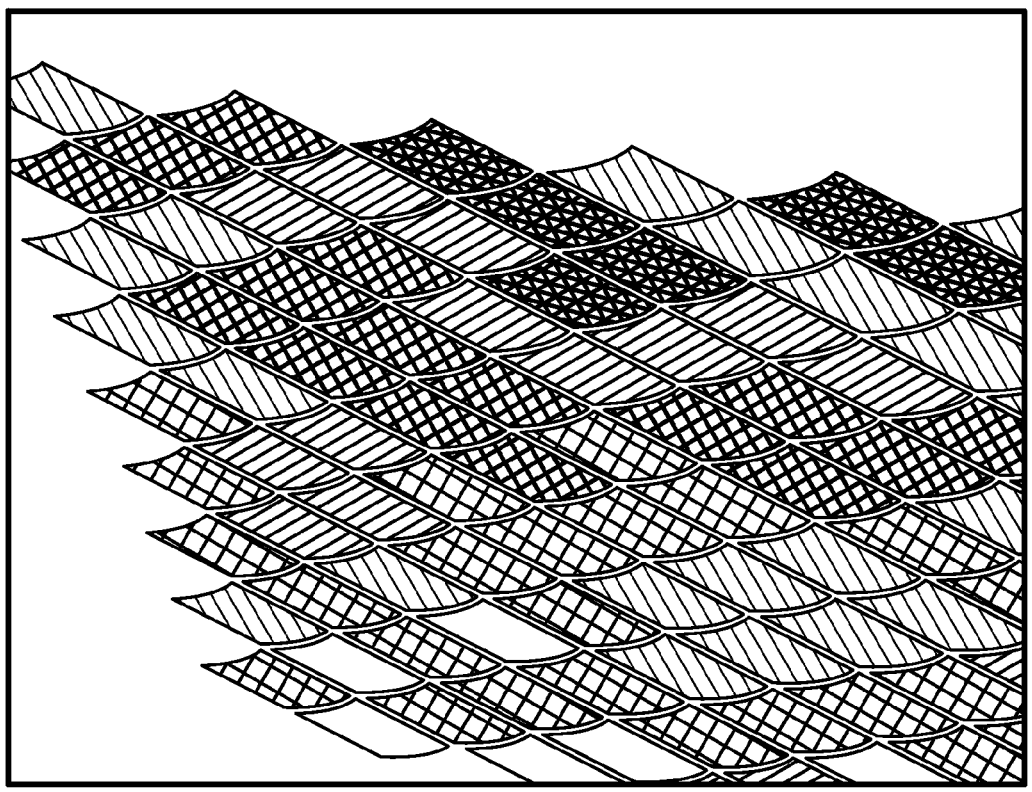
FIG. 8 is an explanatory view illustrating an example light-emitting state of a light emitting device including a light guide in accordance with one or more embodiments of the present invention.

FIG. 8 is an explanatory view illustrating an example light-emitting state of the light emitting device 20 in accordance with one or more embodiments of the present invention. The example illustrated in FIG. 8 shows a light-emitting state in which normal directions of the reflection surfaces of the respective reflection patterns 21 are changed in each light emitting area by (i) providing a plurality of light emitting areas arranged in matrix, (ii) providing light sources having multiple colors, and (iii) arraying the reflection patterns 21 in parallel to one another so that, in the reflection areas corresponding to the light emitting areas in the back surface of the light guide plate 20, the normal directions of the reflection surfaces of the reflection patterns 21 (normal directions of the reflection surfaces seen from a direction orthogonal to the back surface of the light guide plate 20) are in parallel to an optical axis direction of light emitted from the light sources corresponding to the light emitting areas. By arranging the reflection patterns 21 as described above, in each light emitting area, the brightness is continuously changed in accordance with the position in the light emitting area, and therefore, the light emitting area is three-dimensionally recognized.

As described above, according to one or more embodiments of the present invention, by changing luminescent colors or light-emitting states in the light emitting areas for each light emitting area and by causing an observer to recognize the light emitting areas whose brightness is continuously changed in accordance with the position in the light emitting area. This makes it possible to three-dimensionally recognize the light emitting areas.

Above, an arrangement is described in which the light sources 10a to 10d are arranged to face a single side surface of the light guide plate 20, however, an arrangement is not limited thereto, and the light sources 10a to 10d may be arranged to face a plurality of side surfaces. Further, the number of light sources is not particularly limited.

Above, an arrangement is described in which a single light source is provided for a single light emitting area, however, an arrangement is not limited thereto. For example, the arrangement may be such that light emitted from a plurality of light sources is emitted from a single light emitting area.

A light guide in accordance with one or more embodiments of the present invention, for guiding light emitted from at least one light source and causing the light to be emitted from at least one light emitting area which is defined in a part of a light exit surface, the light guide including: a plurality of reflection patterns arranged in at least one reflection area on a facing surface facing the light exit surface, which at least one reflection area corresponds to the at least one light emitting area, the plurality of reflection patterns being arranged so that an amount of the light arriving at an observer observing the light exit surface from the at least one light emitting area after being reflected on a reflection pattern among the plurality of reflection patterns is continuously changed in accordance with a position in the at least one light emitting area.

According to the arrangement, the amount of the light arriving at the observer observing the light exit surface from the light emitting area can be continuously changed in accordance with the position in the light emitting area. Therefore, it is possible to cause the observer to recognize the light emitting areas as a light emitting area having a light part and a dark part. This makes it possible to cause the observer to three-dimensionally recognize the light emitting area.

Further, in each of the plurality of reflection patterns, an angle between (i) a straight line connecting a light source corresponding to the reflection pattern among the at least one light source and a center of the reflection pattern and (ii) a reflection surface of the reflection pattern, the reflection surface being for reflecting the light, may be continuously changed in accordance with where the reflection pattern from which the light is reflected is located in the at least one reflection area.

According to the arrangement, an emitting direction of light emitted from the light emitting area can be changed in accordance with the position in the light emitting area. Therefore, the amount of the light arriving at the observer from the light emitting area can be continuously changed in accordance with the position in the light emitting area. Therefore, it is possible to cause the observer to recognize the light emitting area as a light emitting area having a light part and a dark part. This makes it possible to three-dimensionally recognize the light emitting area.

Further, the plurality of reflection patterns may be arranged along a concentric circle around a pattern arrangement center which is defined at a position in a straight line connecting a part of a reflection area in which the plurality of reflection patterns are arranged among the at least one reflection area and a light source to which the plurality of reflection patterns correspond among the at least one light source.

According to the arrangement, in each of the plurality of reflection patterns, the angle between (i) the straight line connecting the light source corresponding to the reflection pattern among the at least one light source and the center of the reflection pattern and (ii) the reflection surface of the reflection pattern is continuously changed in accordance with where the reflection pattern from which the light is reflected is located in the reflection area.

Further, each of the at least one reflection area may be such that the reflection surfaces of the plurality of reflection patterns arranged in the reflection area are substantially in parallel to one another.

According to the arrangement, in each of the plurality of reflection patterns, the angle between (i) the straight line connecting the light source corresponding to the reflection pattern among the at least one light source and the center of the reflection pattern and (ii) the reflection surface of the reflection pattern is continuously changed in accordance with where the reflection pattern from which the light is reflected is located in the reflection area.

Further, density of each of the plurality of reflection patterns may be continuously changed in accordance with where the reflection pattern is located in the at least one reflection area.

According to the arrangement, the amount of the light reflected from the reflection area and emitted from the light emitting area can be continuously changed in accordance with the position in the light emitting area. Therefore, it is possible to cause the observer to recognize the light emitting areas as a light emitting area having a light part and a dark part. This makes it possible to cause the observer to three-dimensionally recognize the light emitting area.

Further, each of the plurality of reflection patterns may be such that an angle between a reflection surface of the reflection pattern, the reflection surface being for reflecting the light, and the facing surface is continuously changed in accordance with where the reflection pattern is located in the at least one reflection area.

According to the arrangement, the emitting direction of the light emitted from the light emitting area can be continuously changed in accordance with the position in the light emitting area. Accordingly, the amount of the light arriving at the observer observing the light exit surface from the light emitting area can be continuously changed in accordance with the position in the light emitting area. Therefore, it is possible to cause the observer to recognize the light emitting areas as a light emitting area having a light part and a dark part. This makes it possible to cause the observer to three-dimensionally recognize the light emitting area.

Further, the light exit surface may include a plurality of light emitting areas.

According to the arrangement, the amount of the light arriving at the observer observing the light exit surface from the light emitting area can be continuously changed in accordance with the position in the light emitting area. Therefore, it is possible to cause the observer to recognize the light emitting areas. This makes it possible to cause the observer to three-dimensionally recognize the light emitting area.

One or more of the plurality of light emitting areas may be configured to receive light from one of the light sources while another one or more of the plurality of light emitting areas are configured to receive light from another one of the light sources, each of the plurality of light emitting areas being configured to cause the respective light to be reflected by the plurality of reflection patterns arranged in the reflection area corresponding to the light emitting area.

According to the arrangement, it is possible to cause the observer to three-dimensionally recognize each light emitting area, and luminescent colors, light-emitting timings, light emission intensities, and the like of the light emitting areas can be changed in each light emitting area.

The plurality of reflection patterns may be arranged along a concentric circle around a pattern arrangement center which is defined at a position on a straight line connecting (i) a part of a reflection area in which the plurality of reflection patterns are arranged among the reflection areas and (ii) a light source to which the plurality of reflection patterns correspond among the light sources.

According to the arrangement, it is possible to cause the observer to three-dimensionally recognize each light emitting area, and luminescent colors, light-emitting timings, light emission intensities, and the like of the light emitting areas can be changed in each light emitting area.

A light emitting device, includes: a light source; and the any one of the light guiding bodies for guiding light emitted from the light source and causing the light to be emitted from a light emitting area of the light guide, the light emitting area being defined on a part of a light exit surface of the light guide.

According to the arrangement, it is possible to cause an observer to three-dimensionally recognize a light emitting area defined in a light exit surface of a light guide.

The present invention is not limited to the embodiments above, and can be modified in numerous ways by a skilled person as long as such modification falls within the scope of the claims. An embodiment derived from a proper combination of technical means disclosed in different embodiments is also encompassed in the technical scope of the present invention.

One or more embodiments of the present invention is applicable to a light guide for guiding light emitting from a light source and emitting the light from a light exit surface, and is applicable to a light emitting device including the same.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1, 1b Light emitting device
10, 10a to 10d Light source
20 Light guide plate (light guide)
21 Reflection pattern
A to E Light emitting area
C, Ca to Cd Arrangement pattern center

The invention claimed is:

1. A light guide for guiding light emitted from at least one light source, comprising:
at least one light emitting area that emits light from the at least one light source, the at least one light emitting area being defined in a part of a light exit surface; and
a plurality of reflection patterns arranged in at least one reflection area on a facing surface facing the light exit surface,
wherein the at least one reflection area corresponds to the at least one light emitting area,
wherein the plurality of reflection patterns are arranged so that an amount of the light arriving at an observer observing the light exit surface from the at least one light emitting area after being reflected on a reflection pattern among the plurality of reflection patterns is continuously changed in accordance with a position in the at least one light emitting area, and
wherein each of the plurality of reflection patterns is such that an angle between a reflection surface of the reflection pattern, the reflection surface being for reflecting the light, and the facing surface is continuously changed in accordance with where the reflection pattern is located in the at least one reflection area.

2. The light guide as set forth in claim 1, wherein, in each of the plurality of reflection patterns, an angle between a straight line connecting a light source corresponding to the reflection pattern among the at least one light source and a center of the reflection pattern and a reflection surface of the reflection pattern, the reflection surface being for reflecting the light, is continuously changed in accordance with where the reflection pattern from which the light is reflected is located in the at least one reflection area.

3. The light guide as set forth in claim 2, wherein the plurality of reflection patterns are arranged along a concentric circle around a pattern arrangement center which is defined at a position in a straight line connecting a part of a reflection area in which the plurality of reflection patterns are arranged among the at least one reflection area and a light source to which the plurality of reflection patterns correspond among the at least one light source.

4. The light guide as set forth in claim 2, wherein each of the at least one reflection area is such that the reflection surfaces of the plurality of reflection patterns arranged in the reflection area are substantially in parallel to one another.

5. The light guide as set forth in claim 1, wherein density of each of the plurality of reflection patterns is continuously changed in accordance with where the reflection pattern is located in the at least one reflection area.

6. A light guide as set forth in claim 1, wherein
the light exit surface includes a plurality of light emitting areas.

7. The light guide as set forth in claim 6, wherein one or more of the plurality of light emitting areas are configured to receive light from one of the light sources while another one or more of the plurality of light emitting areas are configured to receive light from another one of the light sources, each of the plurality of light emitting areas being configured to cause the respective light to be reflected by the plurality of reflection patterns arranged in the reflection area corresponding to the light emitting area.

8. The light guide as set forth in claim 7, wherein the plurality of reflection patterns are arranged along a concentric circle around a pattern arrangement center which is defined at a position on a straight line connecting a part of a reflection area in which the plurality of reflection patterns are arranged among the reflection areas and a light source to which the plurality of reflection patterns correspond among the light sources.

9. The light guide as set forth in claim 7, wherein each of the at least one reflection area is such that the reflection surfaces of the plurality of reflection patterns in the reflection area are substantially in parallel to one another and directions of the reflection surfaces of the plurality of reflection patterns arranged in the reflection area are defined in each reflection area.

10. A light emitting device, comprising:
a light source; and
a light guide as recited in claim 1.

11. The light guide as set forth in claim 1, wherein the angle is continuously changed in accordance with a distance between the light source and each of the plurality of reflection patterns.

* * * * *